(12) United States Patent
Vyvyan

(10) Patent No.: US 9,251,293 B2
(45) Date of Patent: Feb. 2, 2016

(54) DETERMINING COMMON TABLE DEFINITIONS IN DISTRIBUTED DATABASES

(71) Applicant: International Business Machines Corporation, Armonk, NY (US)

(72) Inventor: David R. Vyvyan, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 307 days.

(21) Appl. No.: 14/017,689

(22) Filed: Sep. 4, 2013

(65) Prior Publication Data

US 2014/0074882 A1  Mar. 13, 2014

(30) Foreign Application Priority Data

Sep. 12, 2012 (GB) .................................... 1216243

(51) Int. Cl.
*G06F 17/30* (2006.01)
(52) U.S. Cl.
CPC .... *G06F 17/30979* (2013.01); *G06F 17/30292* (2013.01); *G06F 17/30424* (2013.01); *G06F 17/30575* (2013.01)
(58) Field of Classification Search
CPC .................. G06F 17/30979; G06F 17/30292; G06F 17/30424; G06F 17/30566; G06F 17/30575
See application file for complete search history.

(56) References Cited

U.S. PATENT DOCUMENTS

| 5,625,815 | A | 4/1997 | Maier et al. |
| 6,748,393 | B1 | 6/2004 | Kapoor et al. |
| 7,680,779 | B2 | 3/2010 | Chaves |
| 7,921,131 | B2 | 4/2011 | Uppala |
| 2009/0077036 | A1 | 3/2009 | Bent et al. |
| 2010/0094892 | A1 | 4/2010 | Bent et al. |
| 2011/0173219 | A1* | 7/2011 | Bent ................. G06F 17/30545 707/769 |
| 2012/0047165 | A1 | 2/2012 | Rugg et al. |

OTHER PUBLICATIONS

Bent et al, "A Dynamic Distributed Federated Database," Second Annual Conference of the International Technology Alliance, London UK, Sep. 2008, 7 pages. (Research was sponsored by the U.S. Army Research Laboratory and the U.K. Ministry of Defence and was accomplished under Agreement No. W911NF-06-3-0001).

(Continued)

*Primary Examiner* — Rehana Perveen
*Assistant Examiner* — Alexander Khong
(74) *Attorney, Agent, or Firm* — Cantor Colburn LLP; Rahan Uddin

(57) ABSTRACT

Determining common table definitions in distributed databases includes independently establishing, for a node in a distributed database, a common network definition for shared logical table names. Establishing the common network definition includes providing local definitions for at least one logical table, and querying at least one node in a network of nodes to determine any existing network definitions for the logical table. If there is no existing network definition, the method includes adding the local definition as a new network definition. If there is an existing network definition, the method includes updating the existing network definition with any extra columns of local definition, and applying an updated network definition to other nodes in the network holding a record of the network definition.

20 Claims, 7 Drawing Sheets

(56) References Cited

OTHER PUBLICATIONS

Bent et al., "Distributed Policy Based Access to Networked Heterogenous ISR Data Sources," Sep. 2010, 6 pages.

Ivanova, et al., "Self-organizing Strategies for a Column-store Database," EDBT'08, Mar. 25-30, 2008, Nantes, France.; Copyright 2008 ACM 978-1-59593-926-06/08/0003, 12 pages.

* cited by examiner

DETERMINING COMMON TABLE DEFINITIONS IN DISTRIBUTED DATABASES

PRIORITY

The present application claims priority to Great Britain Patent Application No. 1216243.4, filed Sep. 12, 2012, and all the benefits accruing therefrom under 35 U.S.C. §119, the contents of which in its entirety are herein incorporated by reference.

BACKGROUND

The present invention relates to distributed databases and, in particular, to determining common table definitions in distributed databases.

A distributed database is a database in which storage devices are not all attached to a common processing unit. The distributed database may be stored in multiple computers located in the same physical location, or may be dispersed over a network of interconnected computers. A distributed database can reside on network servers on the Internet, on corporate intranets or extranets, or on other company networks.

A distributed federated database system is a type of meta-database management system (DBMS), which transparently maps multiple autonomous database systems into a single federated database. The constituent databases are distributed and interconnected via a computer network and may be geographically decentralized.

Through data abstraction, federated database systems can provide a uniform user interface, enabling users and clients to store and retrieve data in multiple non-contiguous databases with a single query, even if the constituent databases are heterogeneous.

Ad-hoc dynamic distributed federated databases (DDFDs) use a "Store Locally Query Anywhere" mechanism (SLQA) which provides for global access to data from any vertex in the database network. Data is stored in local database tables at any vertex in the network and is accessible from any other vertex using structured query language (SQL) like queries and distributed stored procedure-like processing.

The database comprises a set of interconnected vertices each of which is a federated relational database management system (RDBMS) engine. By federated it is meant that the database engine is able to access internal and external sources as if it was one logical database. External sources may include other RDBMS or any other data source as flat files of data records.

Data can be stored at any vertex in the network of database vertices, with the table in which it is stored being available to other vertices through a logical table mapping which is implemented as a virtual table interface. Queries can be performed at any vertex requesting information from any other vertex in the network. The query propagates through the network and result sets are returned to the querying vertex. The vertices manage the forward routing of queries so as to minimise the number of copies of the same query. Each vertex that forwards the query is responsible for processing the results obtained from vertices to which the query was forwarded, leading to a distributed aggregation of results.

In these federated database networks, a "logical table schema definition" is a unified set of column names and associated types which various physical data source structures may be mapped to (for example, a back end RDBMS, or a spread sheet, or a flat CSV file).

As each database node in a DDFD is independent, the same logical table may be defined differently on various nodes in the network. A challenge arises in determining what definition to use for any given logical table name targeted by a DDFD query, where the query may be issued against any node in the network. The definition determines the query response structure.

For query response consistency, the elected definition would ideally be the same irrespective of the originating node. Further, as different definitions may conflict with each other (e.g., if they have 'non-matching' column types for the same column names), an ideal system would resolve ambiguities and apply type promotions as appropriate.

There are three reasons why logical table definitions may differ between nodes: 1) legitimately—if the owner of a certain node adds, removes or modifies certain columns, then other definitions elsewhere may be out of date or just have slightly different data to expose; 2) erroneously—a definition was incorrectly set, which may block access to local data and even disrupt query processing; and 3) maliciously—a definition was purposefully set incorrectly in an attempt to disrupt query processing.

Table definitions are considered to conflict with each other if they have "non-matching" column types for the same column names. Column types may be said to be "non-matching" if they differ in any way at all; or under a more elaborate scheme, they may be said to be "non-matching" if the local column type cannot be promoted to the type expected in the query response (for example, as indicated in the propagated definition).

A table definition matching method may be used where columns are compared by position (instead of by name). Matching by position allows for column re-naming whereas matching by name allows for column-repositioning. It is generally accepted that the latter is preferable in distributed federated databases, because it allows the same queries to be run consistently from anywhere (without having to rename columns) and because it allows nodes to omit columns that exist elsewhere in definitions for the same logical table.

SUMMARY

According to one embodiment of the present invention, there is provided a method for determining common table definitions in distributed databases. The method includes independently establishing, by a node in a distributed database, a common network definition for shared logical table names. The establishing includes providing local definitions for at least one logical table, querying at least one node in a network of nodes to determine any existing network definitions for the logical table, and if there is no existing network definition, the method includes adding the local definition as a new network definition. If there is an existing network definition, the method includes updating the existing network definition with any extra columns of the local definition, and applying an updated network definition to other nodes in the network holding a record of the network definition.

According to a second embodiment of the present invention, there is provided a computer program product for determining common table definitions in distributed databases. The computer program product includes a computer readable storage medium having computer-readable program code embodied therewith, which when executed by a computer processor, causes the computer processor to implement a method. The method includes establishing independently, for a node in a distributed database, a common network definition for shared logical table names. The establishing includes providing local definitions for at least one logical table; querying at least one node in a network of nodes to determine any existing network definitions for the logical table, and if there is no existing network definition, adding the local definition as a new network definition. If there is an existing network definition, the method includes updating the existing network definition with any extra columns of the local definition, and applying an updated network definition to other nodes in network holding a record of the network definition.

According to a third embodiment of the present invention, there is provided a system for determining common table definitions in distributed databases. The system includes a node in a distributed database having a table definition component for independently establishing a common network definition for shared logical table names. The table definition component includes a locally defined logical table loading component for providing local definitions for at least one logical table, a node query component for querying at least one node in a network of nodes to determine any existing network definitions for the logical table, and a new network definition adding component for, if there is no existing network definition, adding local definition as new network definition. The system also includes a network definition update component for, if there is an existing network definition, updating the existing network definition with any extra columns of the local definition and applying the updated network definition to other nodes in the network holding a record of the network definition.

BRIEF DESCRIPTION OF THE SEVERAL VIEWS OF THE DRAWINGS

The subject matter regarded as the embodiments of the invention is particularly pointed out and distinctly claimed in the concluding portion of the specification. The embodiments, both as to organization and method of operation, together with objects, features, and advantages thereof, may best be understood by reference to the following detailed description when read with the accompanying drawings.

The embodiments of the present invention will now be described, by way of example only, with reference to the following drawings in which.

DETAILED DESCRIPTION

Figure 1:
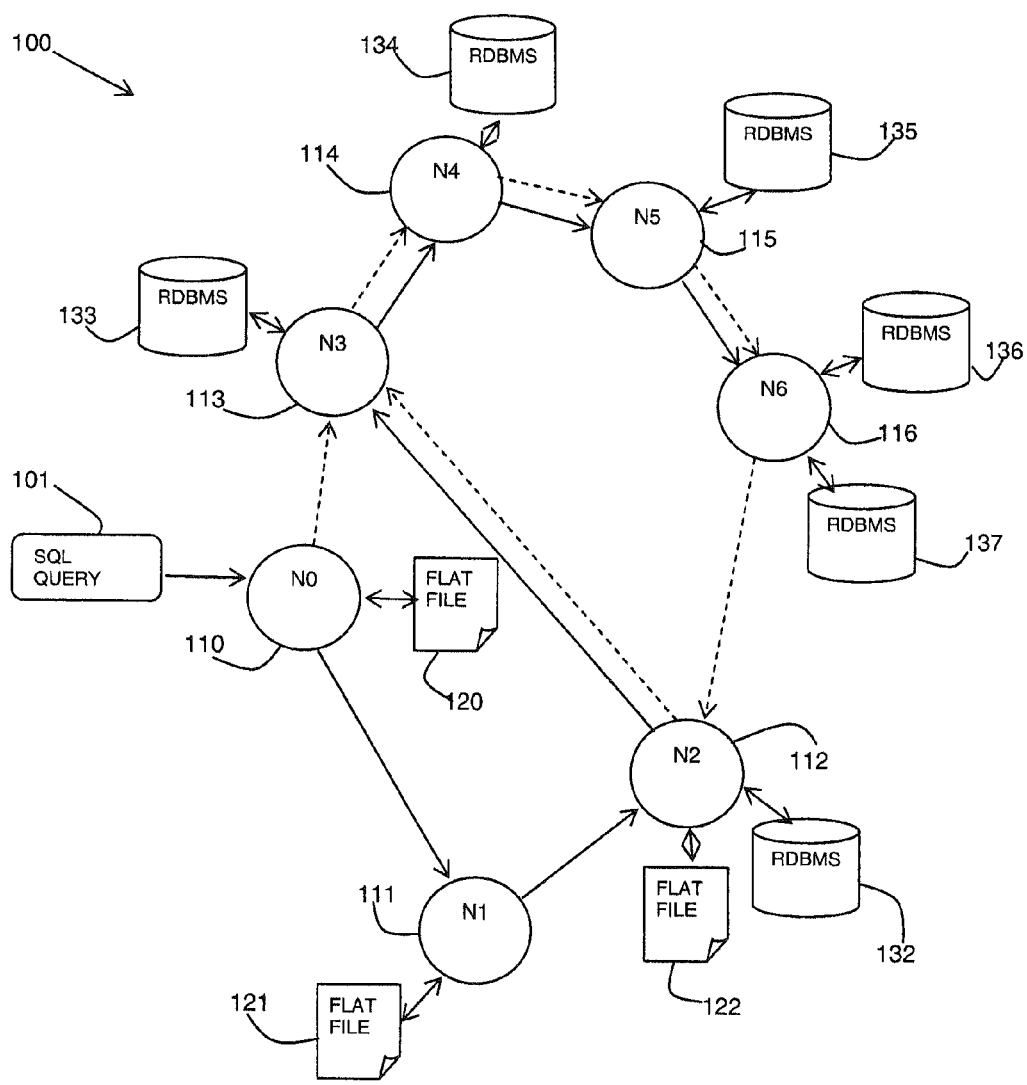
FIG. 1 is a schematic block diagram of an example embodiment of a system in accordance with the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

In the following detailed description, numerous specific details are set forth in order to provide a thorough understanding of the present invention. However, it will be understood by those skilled in the art that the present invention may be practiced without these specific details. In other instances, well-known methods, procedures, and components have not been described in detail so as not to obscure the present invention.

A method and system are provided for independently determining a common table definition at each node for a shared data structure in a distributed database. The embodiments are implemented to ensure every node uses a consistent "expanded network definition" for any queried logical table name. The described method provides a scheme to derive such a definition independently on all nodes.

The described method and system may be applied to various different forms of distributed databases. In particular, they may be used in the context of distributed dynamic databases in which nodes may come and go from the database dynamically and therefore require independence in the database.

In a specific context, the described method and system may be applied in a distributed dynamic federated database (DDFD) network in which nodes use a "Store Locally Query Anywhere" mechanism (SLQA) which provides for global access to data from any vertex in the database network. Data is stored in local database tables at any vertex in the network and is accessible from any other vertex using SQL-like queries and distributed stored procedure-like processing.

In the method and system, nodes are described as each independently establishing a common definition for their shared table schemas, such that they can all query any given distributed structure and receive an equal result from any of them, irrespective of whether or not they expose any data for those tables or even have any prior knowledge of them at all.

An "expanded network definition" for a logical table is provided as a superset consisting of all distinct column names that are used in all definitions of the logical table across the network. For column names having a "matching" type across the whole network, that type would be used. For columns having "non-matching" types (as explained in the background section above), a scheme would be chosen to elect what type to use. In the simplest embodiment, columns having "non-matching" types across the network may just be removed from the network definition.

Nodes in the network may resolve this global network definition in many different ways. A preferred solution embodiment is described below.

Referring to FIG. 1, a schematic block diagram shows an example embodiment of a dynamic distributed federated database (DDFD) system 100 in which the described method and system may be implemented.

The system 100 includes multiple nodes 110-116, also referred to as vertices, which are connected by one or more networks. Each node 110-116 may be a federated Relational Database Management System (RDBMS) engine which is able to access internal and external sources as if it was one logical database. External sources may include other RDBMSs 132-137 or any other data source as flat files 120-122 of data records.

Data stored at the nodes 110-116 may be accessible from any other node using SQL-like queries and distributed stored procedure-like processing.

The table in which data is stored is available to other nodes through a logical table mapping which is implemented as a virtual table interface. Queries can be performed at any node requesting information from any other node in the network.

The query propagates through the network and result sets are returned to the querying node. The nodes manage the forward routing of queries so as to minimize the number of copies of the same query. Each node that forwards the query is responsible for processing the results obtained from nodes to which the query was forwarded, leading to a distributed aggregation of results.

Figure 2:
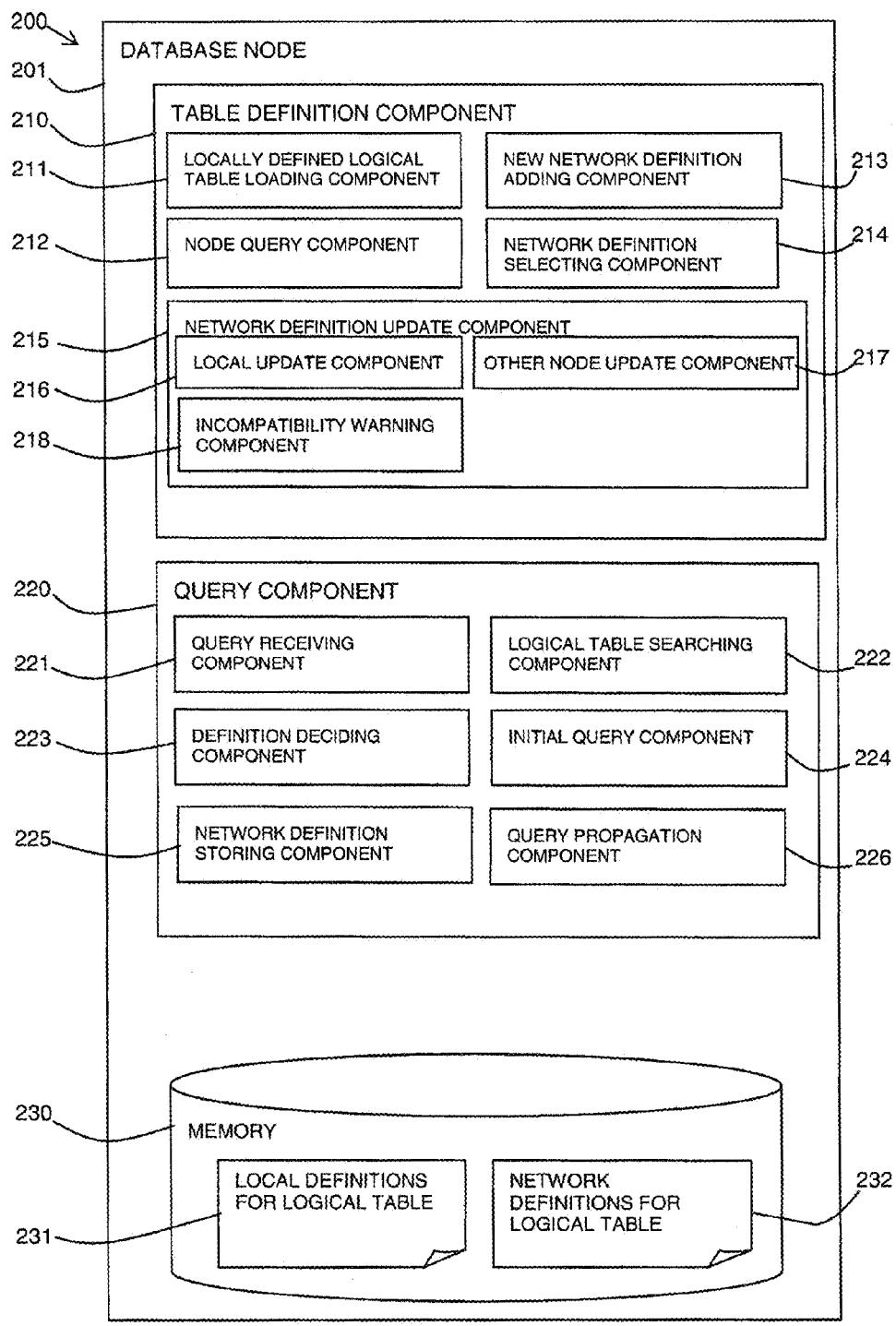
FIG. 2 is a block diagram of an example embodiment of a system in accordance with the present invention.

Referring to FIG. 2, a block diagram shows an example embodiment of the described system 200. A database node 201 is shown which has a record 231 of local definitions for a logical table and a record of network definitions 232 for a logical table both stored in memory 230 which is at, or accessible by, the node 201.

A table definition component 210 is provided which updates definitions for logical tables between the node 201 and other nodes to provide network definitions 232 for a logical table.

The table definition component 210 of a node 201 may include a locally defined logical table loading component 211 for loading locally defined logical tables when a node joins a network. A node query component 212 may be provided to query nodes in the network to determine existing network definitions for local definitions. A new network definition adding component 213 may be provided for adding a local definition as a new network definition at the node. A network definition component 214 may be provided for selecting a network definition from multiple definitions available at nodes in the network.

The table definition component 210 may also include a network definition update component 215 for updating existing network definitions for a logical table. A local update component 216 may be provided for updating the local record of network definitions including supplementing extra columns, promoting columns to narrowest type, etc. An incompatibility warning component 218 may raise a warning if incompatible column types arise. Another node update component 217 may be provided to update other nodes in the network with updated network definitions.

The database node 201 may also include a query component 220 with a query receiving component 221 for receiving a query at a node for a logical table. The query component 220 may include a logical table searching component 222 for determining if a logical table is defined locally at the node. A definition deciding component 223 may be provided for deciding if a local definition or a network definition is to be used. An initial query component 224 may be provided to send out an initial query to find network definition from other nodes. A network definition storing component 225 may be provided for storing any found network definitions in memory. A query propagation component 226 may propagate the query with the selected definition (local or network).

Figure 3:
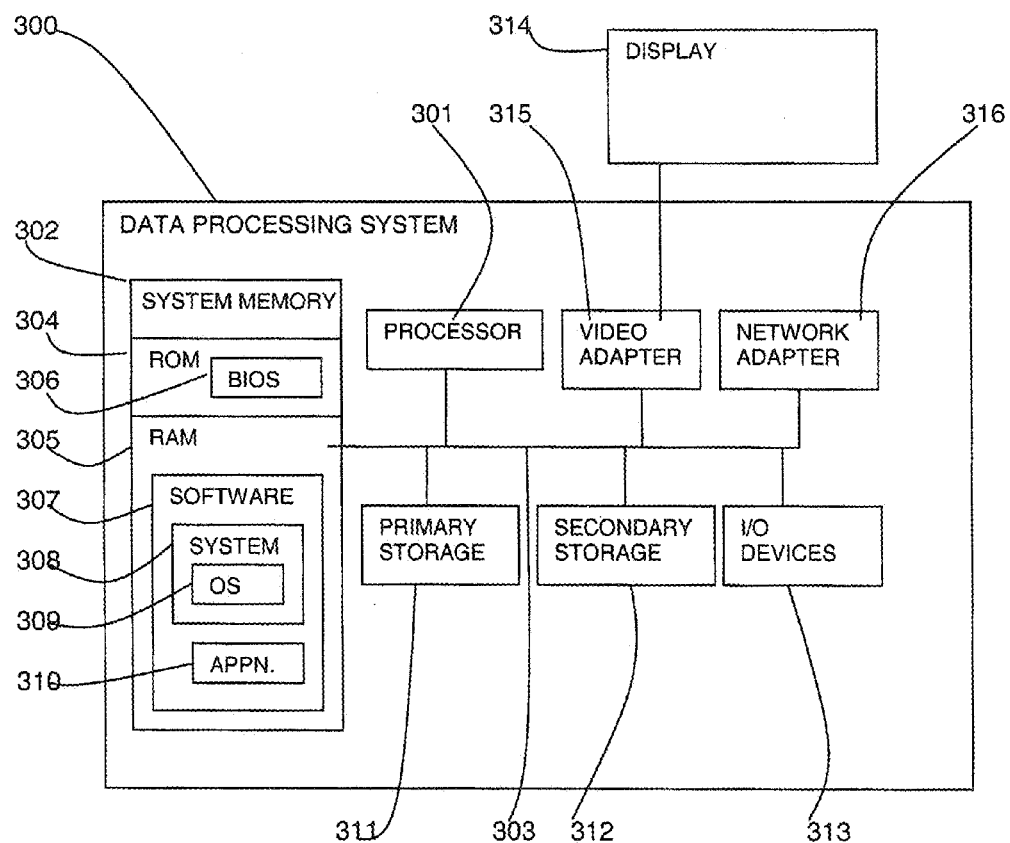
FIG. 3 is a block diagram of an embodiment of a computer system in which the present invention may be implemented.

Referring to FIG. 3, an exemplary system for implementing aspects of the present invention includes a data processing system 300 suitable for storing and/or executing program code including at least one processor 301 coupled directly or indirectly to memory elements through a bus system 303. The memory elements may include local memory employed during actual execution of the program code, bulk storage, and cache memories which provide temporary storage of at least some program code in order to reduce the number of times code must be retrieved from bulk storage during execution.

The memory elements may include system memory 302 in the form of read only memory (ROM) 304 and random access memory (RAM) 305. A basic input/output system (BIOS) 306 may be stored in ROM 304. System software 307 may be stored in RAM 305 including operating system software 308. Software applications 310 may also be stored in RAM 305.

The system 300 may also include a primary storage means 311 such as a magnetic hard disk drive and secondary storage means 312 such as a magnetic disc drive and an optical disc drive. The drives and their associated computer-readable media provide non-volatile storage of computer-executable instructions, data structures, program modules and other data for the system 300. Software applications may be stored on the primary and secondary storage means 311, 312 as well as the system memory 302.

The computing system 300 may operate in a networked environment using logical connections to one or more remote computers via a network adapter 316.

Input/output devices 313 may be coupled to the system either directly or through intervening I/O controllers. A user may enter commands and information into the system 300 through input devices such as a keyboard, pointing device, or other input devices (for example, microphone, joy stick, game pad, satellite dish, scanner, or the like). Output devices may include speakers, printers, etc. A display device 314 is also connected to system bus 303 via an interface, such as video adapter 315.

Figure 4:
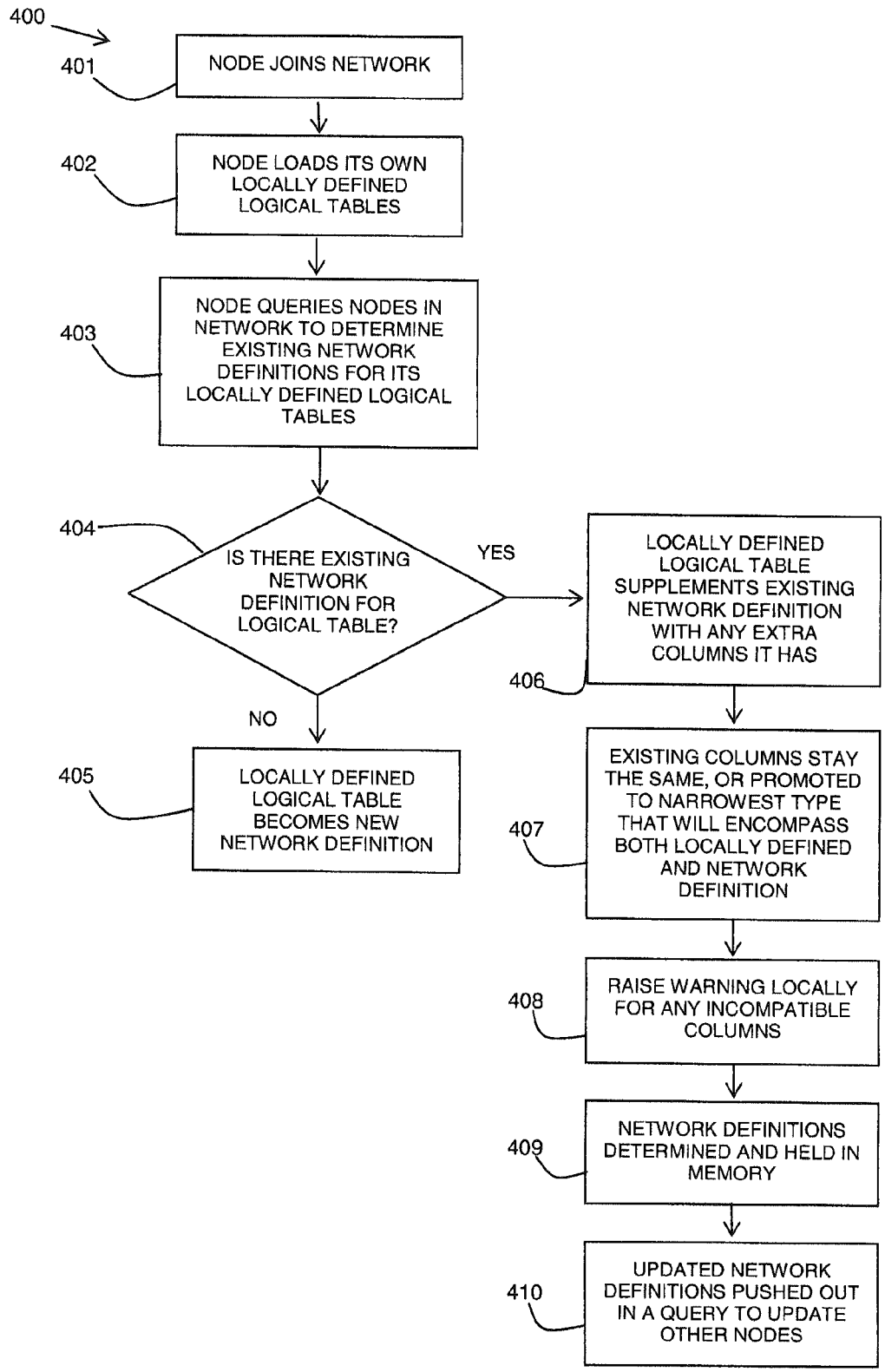
FIG. 4 is a flow diagram of an example embodiment of a method in accordance with the present invention.

Referring to FIG. 4, a flow diagram 400 shows an example embodiment of the described method. The method ensures every node in a distributed database uses the same expanded common network definition.

A node may join 401 a network. The node may load 402 its own locally defined logical tables. The node may query 403 some or all the nodes in the network to determine what are the existing network definitions for its locally defined ones.

It may be determined 404 if there are existing network definitions for a logical table. For logical tables having no existing network definition, the local definition 405 becomes the new network definition.

In one embodiment in which nodes are lazily updated, the new network definition is not replicated anywhere at this point; it is updated on-demand when required. This may minimize overheads.

In another embodiment, using proactive updating, the new network definition may be replicated to other nodes when it is initially defined. In the proactive embodiment, nodes do not need to query a network definition for logical tables they do not know about; they will automatically receive network definitions when they are generated.

Nodes that do not have local definitions for a logical table will not see the network definition; however, definitions will be consistent across the nodes that do have a local definition.

For logical tables having an existing network definition, the local definition may supplement 406 the existing one with any extra columns it may have. Existing columns 407 may stay the same or, if possible, they may be promoted to the narrowest type that will encompass both the local and network definition types.

At this point, optionally, a warning may be raised 408 locally for all columns that have types that are incompatible with the corresponding network definition column type. Administrators may 'disambiguate' these columns.

Network definitions may thus be determined and held in memory 409. The network definitions that have been UPDATED may be pushed out 410 in a query to update all other nodes also holding a record of that network definition.

When a node creates a new local logical table definition, steps 403 to 410 of the flow 400 of FIG. 4 may be followed.

When a node alters a local definition, steps 406 to 410 of the flow 400 of FIG. 4 may be followed.

There may also be a mechanism to alter network definition column types manually, through the use of a distributed API call. This may be required at any time, for example, in situations where a column type in a network definition is no longer compatible with any of the types in local definitions (for example, due to local type changes or nodes dropping out of the network). This type of update would ultimately need to be regulated by authorization/security policies.

Figure 5:
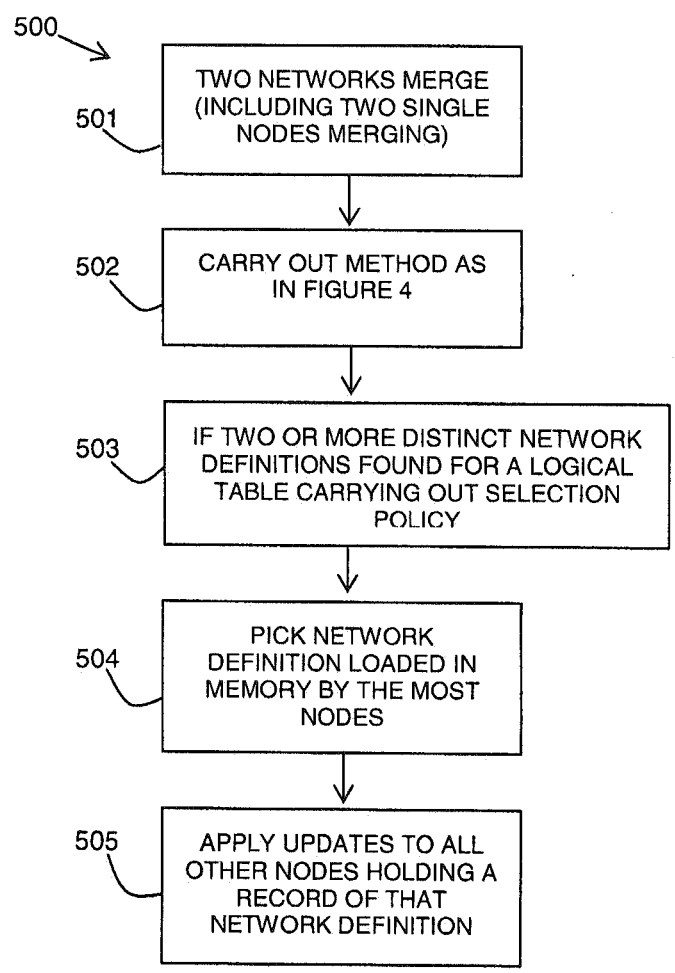
FIG. 5 is a flow diagram of an example embodiment of a method in accordance with the present invention.

Referring to FIG. 5, a flow diagram 500 shows an example embodiment of aspect of the described method. When two networks merge 501 (including when two solitary nodes initially discover each other), the same steps 502 are followed as in FIG. 4, except that if two or more distinct network definitions are found for a logical table a selection policy may be followed 503 as to which definition to use. The selection policy may take various different forms. In one embodiment, the network definition loaded in memory by the most nodes may be selected 504 and the update applied 505 to all other nodes. In cases where the counts of nodes holding distinct definitions are the same, one may be selected at random.

Figure 6:
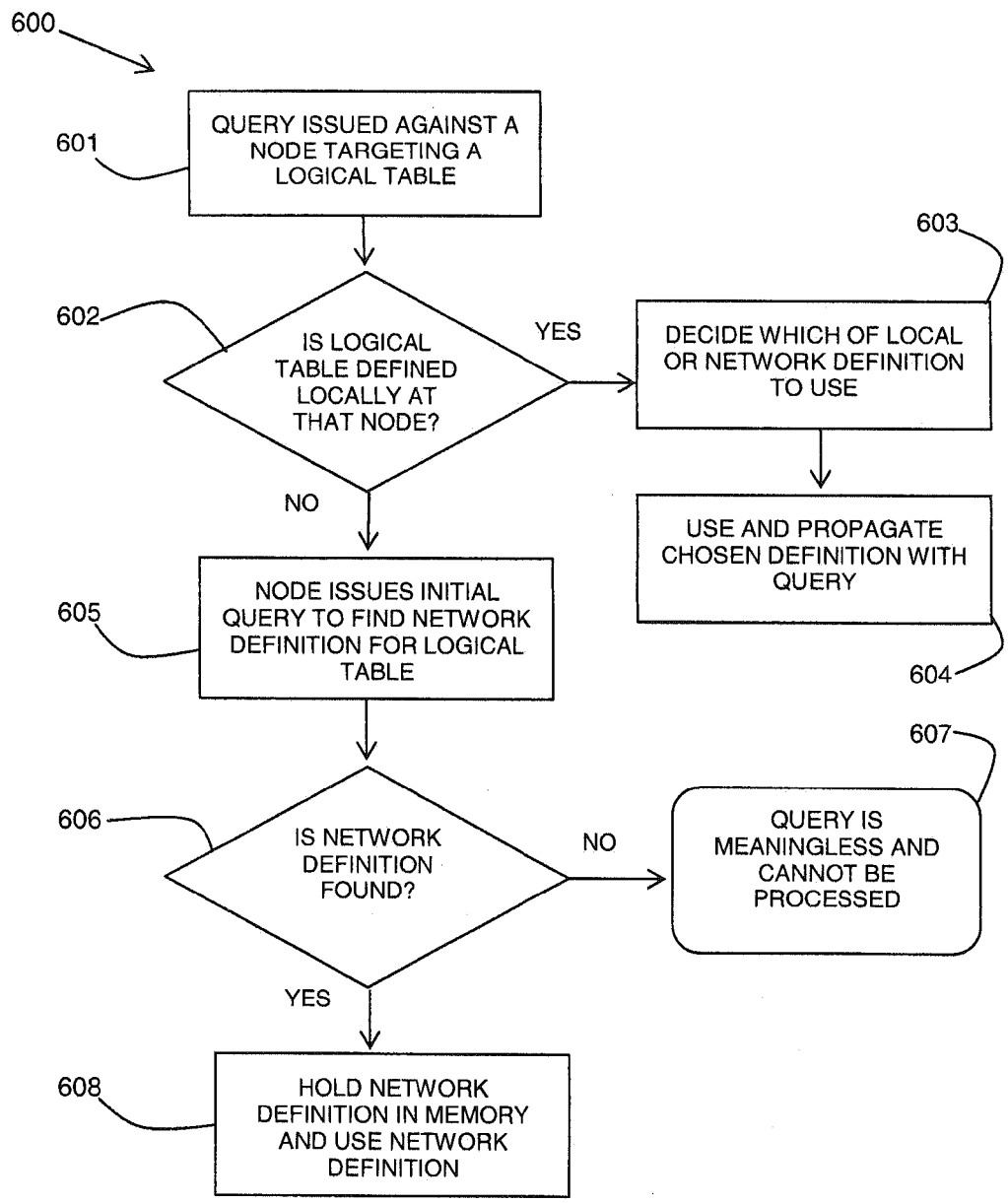
FIG. 6 is a flow diagram of an example embodiment of a method in accordance with the present invention.

Referring to FIG. 6, a flow diagram 600 shows an example embodiment of the described method.

A query may be issued 601 against a node and may target a logical table. It may be determined 602 if the logical table is defined locally on that node.

When a query issued against a node targets a logical table that is defined locally on that node, it may be decided 603 which of the local or network definitions should be used. In one embodiment, this may be defined in the node configuration which specifies that a node always uses a local definition or always uses a network definition. In another embodiment, this may be specified in the query. The chosen definition may be used 604 and propagated with the query to determine the response schema for the query.

When a query issued against a node targets a logical table that is not defined locally on that node, the node may issue 605 an initial query to find a network definition for the targeted logical table. It may be determined 606 if a network definition is found. If there is no definition, the query is meaningless and cannot be processed 607. Otherwise, the network definition may be held in memory and used 608 thereafter to determine the response schema for queries targeting it.

In the event that there are two simultaneous updates to a network definition by two different nodes, a conflict resolution policy may be used. For example, nodes A and B may make simultaneous updates, and B may receive the update from A after it has sent its own update. In another example, nodes may receive the updates in different order, one node may receive A, B whilst another may receive B, A.

The resolution of this conflict may return a message by roll back and the nodes must try again later. Alternatively, the conflict may be resolved based on timestamps included in the updates when sent by the nodes. The conflict may then be resolved in a receiving node based on the earlier timestamp.

Figure 7:
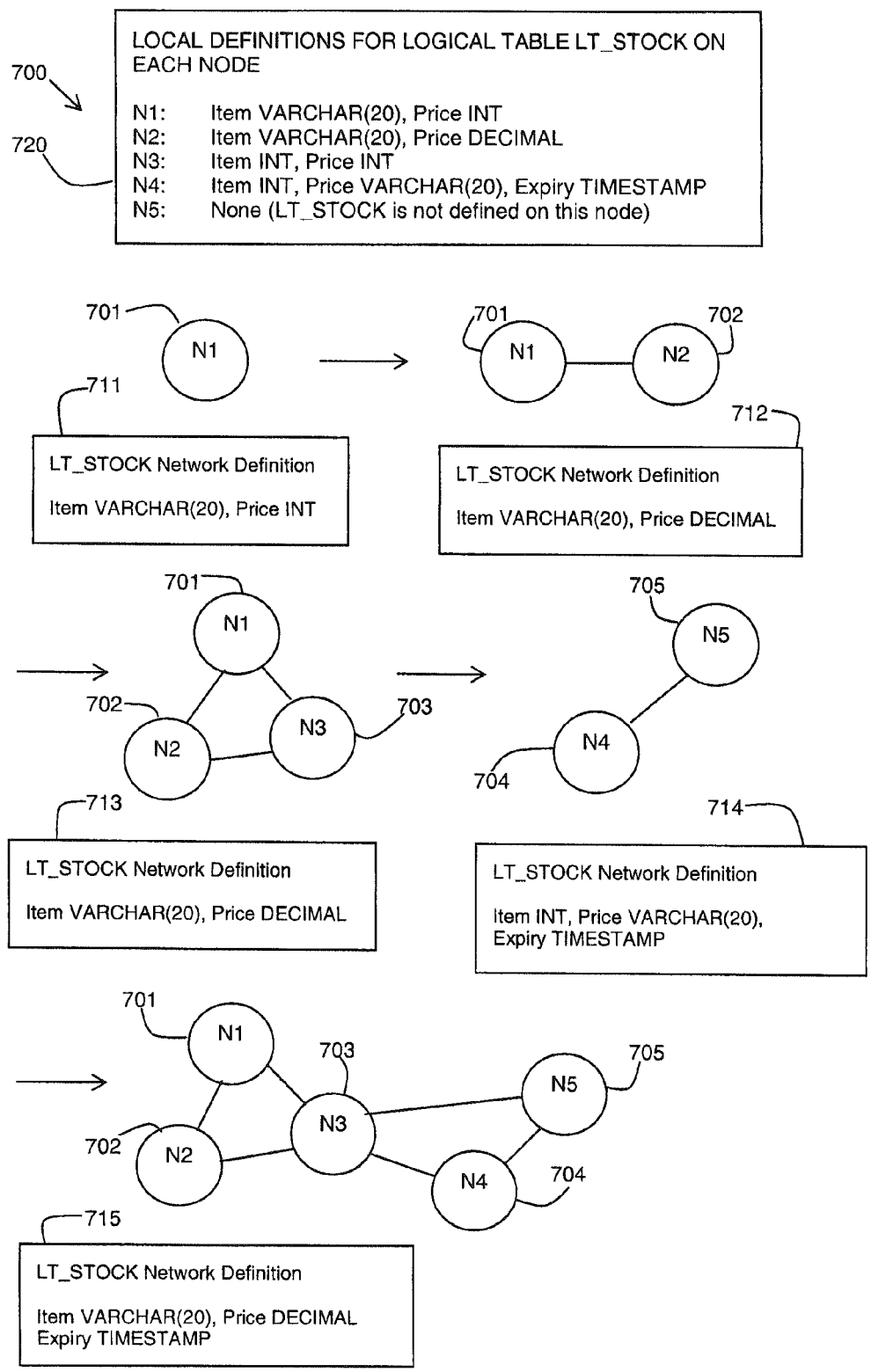
FIG. 7 is a schematic diagram showing a flow of an embodiment of a method in accordance with the present invention in relation to the system components.

Referring to FIG. 7, a schematic diagram 700 shows an example of the evolution of a logical table network definition 711-715 in a growing network. As new nodes are added, the network definition may change, and is held in memory on all nodes that have a local definition for it as well as all nodes that have queried it.

The following list (shown in box 720 of FIG. 7) shows local definitions for a logical table "LT_Stock" on each node which is used in the example shown in FIG. 7:

N1: Item VARCHAR(20), Price INT
N2: Item VARCHAR(20), Price DECIMAL
N3: Item INT, Price INT
N4: Item INT, Price VARCHAR(20), Expiry TIMESTAMP
N5: None (LT_STOCK is not defined on this node)

The illustrated network starts with a single node, N1 701, and the network definition 711 is: "Item VARCHAR(20), Price INT" which corresponds to the local definition on N1 701.

The node N1 701 joins to node N2 702 and the network definition 712 changes to: "Item VARCHAR(20), Price DECIMAL". This change reflects the local definition of "Price" at N2 702 which is "DECIMAL" and which is promoted to update the network definition 712.

Nodes N1 701 and N2 702 join to N3 703. The network definition 713 remains the same, but a warning may be raised for node N3 703 for column "Item" as it is "INT" and may be incompatible with the network definition "VARCHAR(20)".

In a separate network, nodes N4 704 and N5 705 join. The network definition 714 is: "Item INT, Price VARCHAR(20), Expiry TIMESTAMP", which is the local definition of N4 704. N5 705 will load the network definition 714 if a client connects to N5 705 and queries LT_Stock.

The network of N1 701, N2 702, and N3 703 and the network of N4 704 and N5 705 join. The network definition 715 is: "Item VARCHAR(20), Price DECIMAL Expiry TIMESTAMP". The three node network definition 713 takes precedence when resolving conflicting columns as it has more nodes having loaded the definition. Column "Expiry" is added but N1 701, N2 702, and N3 703 expose no data for it yet. Columns "Item" and "Price" from N4 704 will not be accessible using the network definition until the local types are corrected.

The described method and system is not incompatible with electing the local definition for a queried logical table. A mixed-mode system may be used whereby either scheme may be chosen, so that queries may target a logical table based on either the local or the network definition. The chosen definition may be identified either in the query or in the node's configuration.

Members of the network are expected/assumed to cooperate as much as possible in defining logical table semantics and resulting schemas. Malicious attempts to disrupt the distributed database by introducing incompatible logical table definitions or exposing large quantities of irrelevant data through it may be countered by a separate mechanism, e.g., using policy control.

Thus, as can be appreciated from the above, the embodiments offer an advantage of eliminating a need to define logical tables explicitly on all nodes. Queries could be issued from anywhere without required explicit replication of definitions across nodes. Also, the same query issued at different nodes having different definitions would result in the same structural response (i.e., same ResultSet schema). In addition, conflicts in table definitions would be more readily flagged for manual resolution at the time when they would be detected.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

The invention claimed is:

1. A method for determining common table definitions in distributed databases, the method comprising:
    independently establishing, for a node in a distributed database, a common network definition for shared logical table names, the establishing including:
    providing local definitions for at least one logical table;
    querying at least one node in a network of nodes to determine any existing network definitions for the at least one logical table;
    if there is no existing network definition, adding one of the local definitions as a new network definition;
    if there is an existing network definition, updating the existing network definition with any extra columns of the one of the local definitions; and
    applying an updated network definition to other nodes in the network holding a record of the network definition.

2. The method as claimed in claim 1, further comprising:
    holding the network definition in memory on any other nodes that have a local definition for the logical table as well as all nodes that have queried the logical table.

3. The method as claimed in claim 2, wherein the node joins the network and the providing local definitions loads local definitions, including the node creating a new logical table definition, or altering a local definition.

4. The method as claimed in claim 3, further comprising:
    if there is no existing network definition, adding the local definition as a new network definition, and not replicating to other nodes until they become entry-points for a query against the associated logical table.

5. The method as claimed in claims 3, further comprising:
    if there is no existing network definition, adding the local definition as the new network definition, and applying the new network definition to other nodes.

6. The method as claimed in claim 5, wherein at least two networks are merged, and each of the networks includes at least one node, the method further comprising:
    upon determining at least two network definitions are found for a logical table, carrying out a selection policy to determine which of the network definitions to use.

7. The method as claimed in claim 6, wherein a selection policy determines the network definition loaded in memory by the most nodes.

8. The method as claimed in claim 7, wherein upon determining a number of nodes holding network definitions are equal, randomly selecting one of the network definitions.

9. The method as claimed in claim 8, wherein updating existing network definitions includes:
    updating existing columns to a narrowest type that encompasses both the local definition type and the network definition type.

10. The method as claimed in claim 9, wherein updating existing network definitions includes:
    raising a warning locally for any incompatible columns between the local definition type and the network definition type.

11. The method as claimed in claim 10, further comprising:
    manually altering network definition column types using a distributed application programming interface call.

12. The method as claimed in claim 11, further comprising:
    receiving a query at a node targeting a logical table;
    determining if the logical table is defined locally at the node;
    upon determining the logical table is locally defined, selecting one of the local definition or network definition to use; and
    using and propagating the selected definition with query.

13. The method as claimed in claim 11, further comprising:
    receiving a query at a node targeting a logical table;
    determining if the logical table is defined locally at the node;
    upon determining the logical table is not locally defined, issuing an initial query to other nodes in network to find network definition for logical table;
    storing the network definition in memory; and
    using and propagating the selected definition with query.

14. The method as claimed in claim 13, wherein the node is in a distributed dynamic database in which nodes join or leave the database independently.

15. A computer program product for determining common table definitions in distributed databases, the computer program product comprising a non-transitory computer readable storage medium having computer-readable program code embodied therewith, which when executed by a computer processor, causes the computer processor to implement:
    establishing independently, for a node in a distributed database, a common network definition for shared logical table names, including:
        providing local definitions for at least one logical table;
        querying at least one node in a network of nodes to determine any existing network definitions for the at least one logical table;
        if there is no existing network definition, adding one of the local definitions as a new network definition;
        if there is an existing network definition, updating the existing network definition with any extra columns of the one of the local definitions; and
        applying an updated network definition to other nodes in the network holding a record of the network definition.

16. A system for determining common table definitions in distributed databases, the system comprising:
    a node in a distributed database having a table definition component for independently establishing a common network definition for shared logical table names;
    the table definition component including:
    a locally defined logical table loading component for providing local definitions for at least one logical table;
    a node query component for querying at least one node in a network of nodes to determine any existing network definitions for the at least one logical table;
    a new network definition adding component for, upon determining there is no existing network definition, adding one of the local definitions as a new network definition; and
    a network definition update component for, upon determining there is an existing network definition, updating the existing network definition with any extra columns of the one of the local definitions and applying an updated network definition to other nodes in the network holding a record of the network definition.

17. The system as claimed in claim 16, including at least two merged networks, wherein each of the networks includes at least one node, the system further comprising:
   a network definition selecting component for, upon determining at least two network definitions are found for a logical table, selecting one of the network definitions according to a selection policy loaded in memory by the most nodes.

18. The system as claimed in claim 17, wherein the network definition update component updates existing columns to a narrowest type that encompasses both the local definition type and the network definition type.

19. The system as claimed in claim 17, wherein the network definition update component raises a warning locally for any incompatible columns between the local definition type and the network definition type.

20. The system as claimed in claim 19, further comprising:
   a mechanism for manually altering network definition column types using a distributed application programming interface call.

\* \* \* \* \*